Dec. 26, 1933.    F. BURDICK    1,941,245
FISHING REEL
Filed April 18, 1932    2 Sheets-Sheet 1
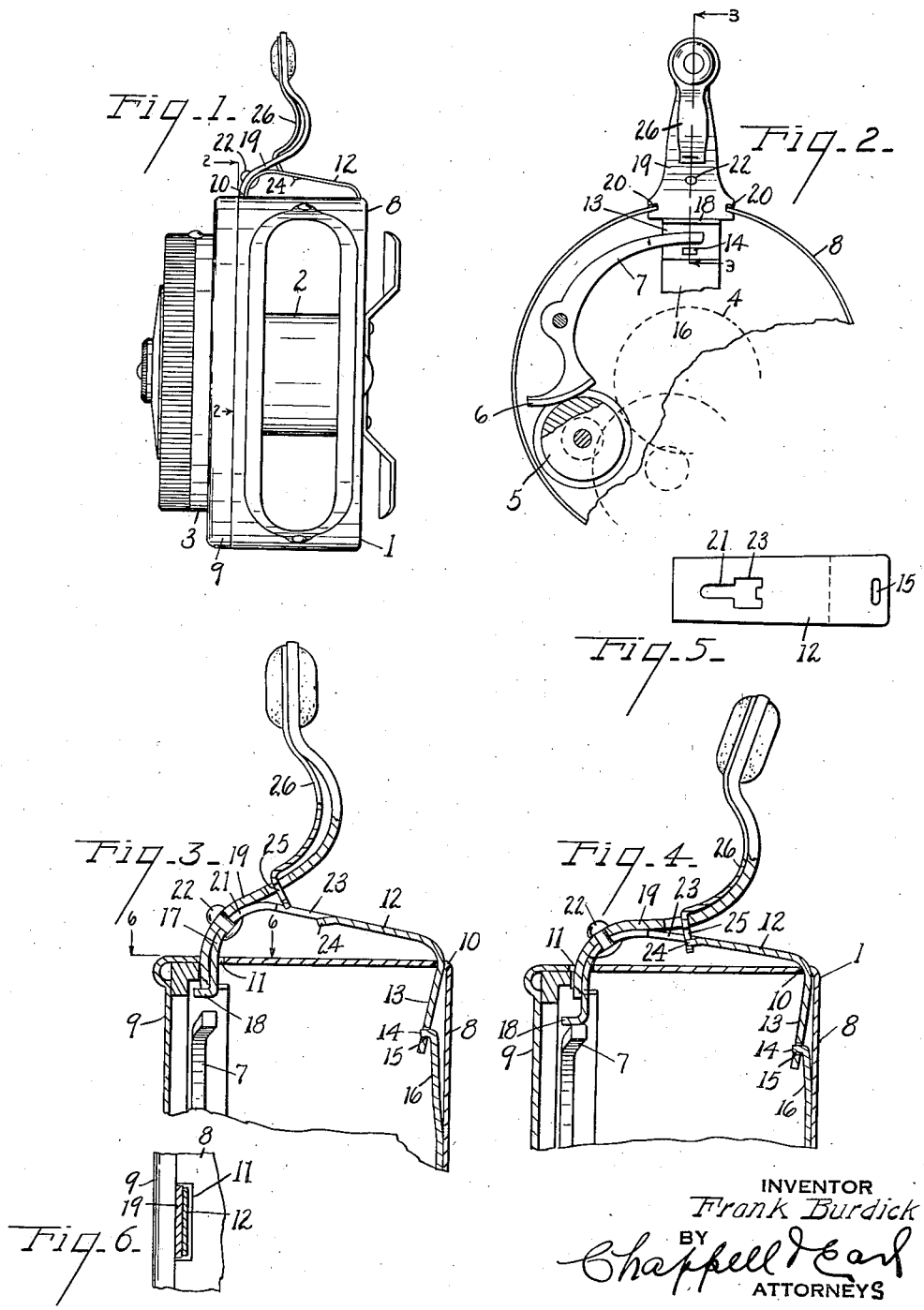
INVENTOR
Frank Burdick
BY
Chappell & Earl
ATTORNEYS Dec. 26, 1933.                F. BURDICK                1,941,245
                              FISHING REEL
                    Filed April 18, 1932        2 Sheets-Sheet 2

INVENTOR
Frank Burdick
BY
Chappell & Earl
ATTORNEYS

Patented Dec. 26, 1933

1,941,245

UNITED STATES PATENT OFFICE 1,941,245

FISHING REEL

Frank Burdick, Kalamazoo, Mich., assignor to Shakespeare Company, Kalamazoo, Mich.

Application April 18, 1932. Serial No. 605,987

19 Claims. (Cl. 242—84.5)

My improvements as illustrated in the accompanying drawings are especially designed by me for use in spring winding fishing reels of the type illustrated in my application for Letters Patent filed June 14, 1930, Serial No. 461,228, Patent No. 1,882,771, dated Oct. 18, 1932, although I desire to point out that the invention in certain embodiments thereof is readily adapted and desirable for use in other types of reels or reels varying considerably in structure from the reel of that application.

The main objects of this invention are:

First, to provide a control means for spring wind fishing reels which is very convenient to manipulate.

Second, to provide a control means which is assembled without using screws or bolts.

Third, to provide a control means with a detent for locking in actuated position which detent is engaged by a pressure in the direction of actuating the finger-piece and is automatically released by pressure on the finger-piece.

Fourth, to provide a structure having these advantages which is very simple and economical in its parts.

Objects relating to details and economies of my invention will appear from the description to follow. The invention is defined and pointed out in the claims.

A structure which is a preferred embodiment of my invention is illustrated in the accompanying drawings, in which:

Fig. 1 is a front elevation of a spring wind fishing reel embodying the features of my invention.

Fig. 2 is a fragmentary view on line 2—2 of Fig. 1.

Fig. 3 is an enlarged fragmentary view mainly in section on a line corresponding to line 3—3 of Fig. 2 with the parts in normal position.

Fig. 4 is a fragmentary section similar to that of Fig. 3 with the parts in actuated position.

Fig. 5 is a plan of the blank from which the actuating lever is formed.

Fig. 6 is a detail section on line 6—6 of Fig. 3.

Figure 7:
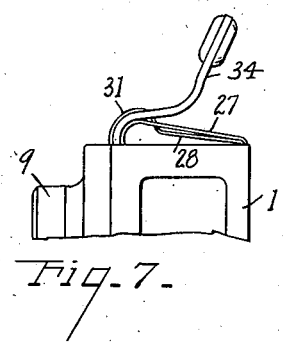
Fig. 7 is a fragmentary elevation of a modified form or embodiment of my invention with parts in actuated position.

Referring to the drawings, the casing designated generally by the numeral 1 is adapted to receive the spool 2, and the winding spring which is arranged within the housing 3 and connected to the spool through a train of gearing indicated at 4 (Fig. 2).

A brake wheel 5 is associated with this gearing thereby connecting it to the spool, this brake wheel having a brake 6 coacting therewith, the brake having an arm 7 through which the brake is controlled, this being the actuated member of the lever mechanism. This mechanism is the subject matter of my said application for Letters Patent, Serial No. 461,228. The brake is arranged to be automatically actuated or engaged on the winding rotation of the spool. My improved releasing mechanism is, in the embodiment illustrated, designed for disengaging and holding this brake in disengaged position.

The casing 1, in the embodiment illustrated, comprises a cylindrical cup-like member 8 and a flanged end plate 9 coacting therewith. The member 8 has a slot 10 adjacent one side thereof and a notch-like opening 11 at the other side or edge thereof, the opening 11 being closed by the end plate 9— see Figs. 3, 4 and 6.

The releasing mechanism comprises the yoke-shaped lever 12 preferably of spring or resilient material having one arm 13 arranged through the opening 10 in the casing and in anchoring engagement with the spring lug 14, the arm having a hole 15 to receive the lug which is formed by angulary bending the end of a spring piece 16 secured to the end of the casing. The other end 17 of the lever is arranged through an opening 11 in the casing and provided with a foot 18 adapted to engage the end of the brake lever 7.

The finger-piece 19 is pivotally or rockingly mounted on the casing by forming the same with slots 20 which are engaged with the edges of the opening 11. The finger-piece has a curved portion which overlies a similarly curved portion on the lever so that when the finger-piece is pressed toward the right with the parts in the position shown in Figs. 1, 3 and 4, the lever is swung inwardly in position to gauge the member 7.

To maintain the parts in proper relation, the lever is provided with a longitudinal slot 21 engaged by the headed pin or stud 22 in the finger-piece.

The lever also has an opening 23 at the rear edge of which is an inwardly directed keeper 24 adapted to enter the opening 25 in the spring detent 26 when the parts are swung to the position shown in Fig. 4. This detent is arranged on the front side of the finger-piece, the detent being fastened at its outer end so that it normally lies in spaced relation to the finger-piece, as shown in Fig. 3. When, however, the finger-piece is actuated to the position shown in Fig. 4, pressure on the spring detent will cause it to engage the keeper and thereby lock the parts in the position shown in Fig. 4 in which position the brake or other actuated part is rendered inoperative.

To release the spring detent it is only necessary to press the finger-piece toward the right and the detent will snap off the keeper and permit the parts to return to the position shown in Fig. 3.

Figure 8:
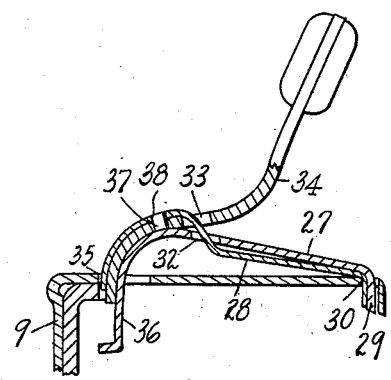
Fig. 8 is an enlarged fragmentary view mainly in section of the embodiment shown in Fig. 7.
Figure 9:
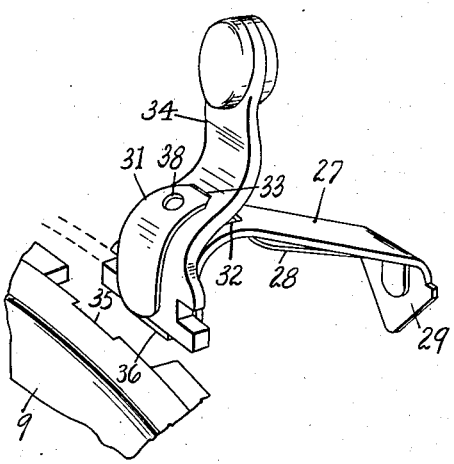
Fig. 9 is a fragmentary perspective of certain of the parts in disassembled relation.

In the modification shown in Figs. 7, 8 and 9, the spring lever 27 has a head portion 29 which is engaged in a slot in the casing, the lever being manipulated through the hole 30 of the casing from the inside of the casing in assembling the parts. This head 29 of the lever 27 anchors it to the casing so that the resilience of the lever tends to return it to its outward or normal position.

The detent spring 28 has an offset portion 31 which is arranged through an opening 32 in the lever and an opening 33 in the finger-piece 34 so that the end portion of the offset 31 overlies the finger-piece and is engaged in the opening 35 corresponding to the opening 11. When pressure is exerted upon the finger-piece, that is, when it is pushed toward the right, the end 36 of the lever is forced into engagement with the parts to be actuated, as illustrated in Fig. 8.

To retain the parts in releasing position the finger-piece is provided with a pin 37 which engages a hole 38 in the offset portion of the spring which serves as a detent, it being necesssary to press downwardly on the offset portion of the spring when the pin is brought into alignment with the hole. Owing to the resiliency of the spring, it automatically releases when the finger-piece is pressed.

The spring lug 16 may be of sufficient resilience so that no springing or yielding of the lever is necesssary, the lug when connected as shown in the drawing being, in effect, a spring or resilient extension of the lever. As stated, the lever proper can be substantially rigid.

A very decided advantage of the mechanism is that it can be assembled and disassembled without the aid of tools and this is true in both embodiments. The manner of anchoring or supporting the lever is of considerable importance, that shown in Figs. 1–6, inclusive, being preferred.

Another feature of advantage is that with this arrangement of lever and finger-piece the thrust or pressure on the actuated part is only sufficient to actuate the same, even though considerable pressure be applied by the operator to the finger-piece; that is, the operator does not need to exercise particular care in gaging the pressure exerted upon the finger-piece, which is a matter of particular advantage in fishing reels.

With this arrangement of parts the brake or other actuated part may be very easily controlled. The finger-piece is positioned so that it is conveniently mmanipulated with the reel mounted upon a fishing rod.

I have illustrated and described my improvements in two embodiments or adaptations which I have found very practical. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. In a fishing reel, the combination of a cylindrical casing having laterally spaced peripheral openings, an actuated element housed within said casing, a spring lug disposed in said casing in alignment with one of said openings, a yoke-shaped spring lever having one arm disposed through one of said openings in coacting relation to said actuated element and the other through the other opening and engaged with said spring lug, said lever having a longitudinally slotted curved portion merging into its actuated element arm and an opening at the rear of the said slot with an inwardly inclined keeper on its rear edge, a finger-piece transversely slotted to engage the edges of said casing opening receiving said actuated element arm whereby said finger-piece is rockingly supported on the casing, said finger-piece having a curved portion over-lying the curved portion of said lever, and a spring detent mounted on the front side of said finger-piece with its inner end disposed through an opening therein, said spring detent having an opening adapted to receive said keeper when the finger-piece is in actuated position thereby locking the lever in its actuated position.

2. In a fishing reel, the combination of a cylindrical casing having laterally spaced peripheral openings, an actuated element housed within said casing, a lug disposed in said casing in alignment with one of said openings, a yoke-shaped lever having one arm disposed through one of said openings in coacting relation to said actuated element and the other through the other opening and engaged with said lug, said lever having a longitudinally curved portion merging into its actuated element arm, and a finger-piece transversely slotted to engage the edges of said casing opening receiving said actuated element arm whereby said finger-piece is rockingly supported on the casing, said finger-piece having a curved portion overlying the curved portion of said lever.

3. In a fishing reel, the combination of a cylindrical casing having laterally spaced peripheral openings, an actuated element housed within said casing, a lug disposed in said casing in alignment with one of said openings, a yoke-shaped spring lever having one arm disposed through one of said openings in coacting relation to said actuated element and the other through the other opening and engaged with said lug, said lever having a longitudinally curved slotted portion merging into its actuated element arm, and a finger-piece transversely slotted to engage the edges of said casing opening receiving said actuated element arm whereby said finger-piece is rockingly supported on the casing, said finger-piece having a curved portion overlying the curved portion of said lever and provided with a stud engaging the said slot therein.

4. In a fishing reel, the combination of a cylindrical casing having laterally spaced peripheral openings, an actuated element housed within said casing, a lever having an arm disposed through one of said openings in coacting relation to said actuated element and the other anchored within the other opening, said lever having a curved portion merging into the actuated element arm and an opening with an inwardly inclined keeper on its rear edge, a finger-piece rockingly engaged with the edges of the casing opening receiving said actuated element arm of said lever, and having a curved portion coacting with the curved portion of said lever, and a detent mounted on the front side of said finger-piece with its inner end disposed through an opening therein, said detent having an opening adapted to receive said keeper when the finger-piece is in actuated position thereby locking the lever in its actuated position.

5. In a fishing reel, the combination of a cylindrical casing having laterally spaced peripheral openings, an actuated element housed within said casing, a lever having an arm disposed through one of said openings in coacting relation to said actuated element and the other anchored within the other opening, said lever having a curved portion merging into the actuated element arm, and a finger-piece rockingly engaged with the edges of the casing opening receiving said actuated element arm of said lever, and having a curved portion coacting with the curved portion of said lever.

6. In a fishing reel, the combination of a cylindrical casing having laterally spaced peripheral openings, an actuated element housed within said casing, a lever having an arm disposed through one of said openings in coacting relation to said actuated element and the other anchored within the other opening, said lever having a curved portion merging into the actuated element arm and an opening at the rear of the said curved portion with an inwardly inclined keeper on its rear edge, a finger-piece rockingly engaged with the edges of the casing opening receiving said actuated element arm of said lever, and having a curved portion coacting with the curved portion of said lever and provided with a stud slidably engaging the lever, and a detent mounted on the front side of said finger-piece with its inner end disposed through an opening therein, said detent having an opening adapted to receive said keeper when the finger-piece is in actuated position thereby locking the lever in its actuated position.

7. The combination with a frame, of an actuated element housed therein, a spring lug mounted within said frame, a spring lever having one end in anchoring engagement with said lug, its other end being springable and disposed in coacting relation to the actuated element, a finger-piece mounted on said frame in cooperating relation to the lever, and a spring detent mounted on the front side of said finger-piece, said lever having a keeper coacting with said detent when the lever is actuated and said detent is under stress whereby pressure upon the detent may be released by pressure upon the finger-piece.

8. The combination with a frame, of an actuated element housed therein, a spring lug mounted within said frame, a spring lever having one end in anchoring engagement with said lug, its other end being springable and disposed in coacting relation to the actuated element, and a finger-piece mounted on said frame in cooperating relation to the lever.

9. The combination with a frame, of an actuated element housed therein, a spring lug mounted within said frame, a spring lever having one end in anchoring engagement with said lug, its other end being springable and disposed in coacting relation to the actuated element, and a finger-piece mounted on said frame in cooperating relation to the lever, said lever and finger-piece having curved overlying parts provided with pin and slot sliding connection.

10. The combination with a frame, of an actuated element housed therein, a lever having one end anchored upon said frame, its other end being disposed in coacting relation to the actuated element, a finger-piece mounted on said frame in cooperating relation to the lever, said lever and finger-piece having overlying parts, and a detent mounted on the front side of said finger-piece, said lever having a keeper coacting with said detent when the lever is actuated and said detent is under stress whereby pressure upon the detent may be released by pressure upon the finger piece.

11. The combination with a frame, of an actuated element housed therein, a lever having one end anchored upon said frame, its other end being disposed in coacting relation to the actuated element, and a lever-like finger-piece mounted at one end on said frame in cooperating relation to the lever, said lever and finger-piece having overlying parts.

12. The combination with a frame, of an actuated element housed therein, a lever operatively associated with said actuated element and normally yieldingly urged to inoperative position, a finger-piece mounted on said frame in overlapping relation to said lever, said lever and finger-piece having co-engaging curved portions, a sliding connection at said curved portions, and a manually engaged spring detent for holding said lever in actuated position and adapted to be automatically released by pressure on said finger-piece when the detent is in engaging position.

13. The combination of a frame, an actuated element, a lever operatively associated with said actuated element and normally yieldingly urged to inoperative position, a finger-piece mounted on said frame in overlapping relation to said lever, and a spring manually engaged detent for holding said lever in actuated position and adapted to be automatically released by pressure on said finger-piece when the detent is in engaging position.

14. The combination of a frame, an actuated element, a lever operatively associated with said actuated element and normally yieldingly urged to inoperative position, and a finger-piece mounted on said frame in overlapping relation to said lever, said lever and finger-piece having co-engaging curved portions, and a sliding connection at said curved portions.

15. The combination of a frame, an actuated element, a lever operatively associated with said actuated element and normally yieldingly urged to inoperative position, and a lever-like finger-piece mounted at one end on said frame in overlapping relation to said lever.

16. In a fishing reel, the combination of a frame, a yoke-shaped spring lever disposed transversely of said frame and having one arm anchored within the frame, the other arm projecting into the frame into coacting relation with an actuated member, a finger-piece pivotally mounted on said frame in overlying relation to the swinging end of the lever whereby the lever is actuated with a movement of the finger-piece transversely of the frame, and a spring detent mounted on the front side of said finger-piece so as to be urged to engaged position by the application of pressure in the direction of the actuating movement of the finger-piece.

17. In a fishing reel, the combination of a frame, a yoke-shaped spring lever disposed transversely of said frame and having one arm anchored within the frame, the other arm projecting into the frame into coacting relation with an actuated member, and a finger-piece pivotally mounted on said frame in overlying relation to the swinging end of the lever whereby the lever is actuated with a movement of the finger-piece transversely of the frame.

18. In a fishing reel, the combination of a frame, a lever disposed transversely of said frame and supported thereon at one end, the other projecting into the frame into coacting relation with an actuated member, a finger-piece pivotally mounted on said frame in superimposed relation to the lever whereby the lever is actuated with a movement of the finger-piece transversely of the frame, and a detent mounted on the front side of said finger-piece so as to be urged to engaged position by the application of pressure in the direction of the actuating movement of the finger-piece.

19. In a fishing reel, the combination of a frame, a lever disposed transversely of said frame and supported thereon at one end, the other projecting into the frame into coacting relation with an actuated member, and a finger-piece pivotally mounted on said frame in superimposed relation to the lever whereby the lever is actuated with a movement of the finger-piece transversely of the frame.

FRANK BURDICK.